US009118430B2

(12) United States Patent
Balasubramanian et al.

(10) Patent No.: US 9,118,430 B2
(45) Date of Patent: Aug. 25, 2015

(54) BROADCAST EQUIPMENT COMMUNICATION PROTOCOL

(71) Applicant: iBiquity Digital Corporation, Columbia, MD (US)

(72) Inventors: Muthu Gopal Balasubramanian, Ellicott City, MD (US); Rodney Burke, Catonsville, MD (US); Russell Iannuzzelli, Bethesda, MD (US); Steven Andrew Johnson, Ellicott City, MD (US); Stephen Douglas Mattson, Felton, PA (US); Jeffrey R. Detweiler, Ellicott City, MD (US)

(73) Assignee: iBiquity Digital Corporation, Columbia, MD (US)

( * ) Notice: Subject to any disclaimer, the term of this patent is extended or adjusted under 35 U.S.C. 154(b) by 141 days.

(21) Appl. No.: 13/905,879

(22) Filed: May 30, 2013

(65) Prior Publication Data

US 2013/0265918 A1 Oct. 10, 2013

Related U.S. Application Data

(62) Division of application No. 12/100,842, filed on Apr. 10, 2008, now abandoned.

(51) Int. Cl.

*G06F 15/16* (2006.01)
*H04H 20/95* (2008.01)
*H04H 60/79* (2008.01)
*H04H 20/06* (2008.01)

(52) U.S. Cl.

CPC ............... *H04H 20/95* (2013.01); *H04H 60/79* (2013.01); *H04H 20/06* (2013.01); *H04H 2201/20* (2013.01)

(58) Field of Classification Search

CPC ... H04H 2201/20; H04H 20/95; H04H 60/79; H04H 20/06
USPC .......................... 709/201–226; 370/480–490; 455/500–550
See application file for complete search history.

(56) References Cited

U.S. PATENT DOCUMENTS

| | | | |
|---|---|---|---|
| 5,216,675 | A | 6/1993 | Melliar-Smith et al. |
| 5,826,017 | A | 10/1998 | Holzmann |
| 5,848,354 | A | 12/1998 | Kamalski |
| 6,178,444 | B1 | 1/2001 | Okataku et al. |
| 6,356,950 | B1 | 3/2002 | Tillmann et al. |
| 6,434,138 | B2 | 8/2002 | Kersken et al. |

(Continued)

OTHER PUBLICATIONS

"Digital Radio Mondiale (DRM); Multiplex Distribution Interface (MDI)", ETSI TS 102 820, V1.2.1 (Oct. 2005), 23 pgs.

(Continued)

*Primary Examiner* — John MacIlwinen
(74) *Attorney, Agent, or Firm* — Robert P. Lenart, Esq.; Pietragallo Gordon Alfano Bosick & Raspanti, LLP

(57) ABSTRACT

A data link manager includes a User Datagram Protocol (UDP) receiver for receiving HD Radio broadcast equipment communication protocol (HDP) data or non-HD Radio broadcast equipment communication protocol (non-HDP) data using a User Datagram Protocol/Internet Protocol (UDP/IP) protocol; a Transmission Control Protocol (TCP) receiver; and a router for receiving data from the UDP receiver and the TCP receiver, for searching for a destination route in a routing table, and for forwarding the data received from the from the UDP receiver and the TCP receiver to an identified destination route.

9 Claims, 18 Drawing Sheets

(56) References Cited

U.S. PATENT DOCUMENTS

| | | | | |
|---|---|---|---|---|
| 6,791,963 | B1 | 9/2004 | Hwang et al. | |
| 7,020,123 | B2 | 3/2006 | Park et al. | |
| 7,221,660 | B1 | 5/2007 | Simonson et al. | |
| 7,296,091 | B1 * | 11/2007 | Dutta et al. | 709/245 |
| 7,305,043 | B2 | 12/2007 | Milbar et al. | |
| 2003/0083977 | A1 * | 5/2003 | Syed | 705/37 |
| 2004/0085962 | A1 | 5/2004 | Sugai et al. | |
| 2004/0131014 | A1 | 7/2004 | Thompson, III et al. | |
| 2004/0252725 | A1 | 12/2004 | Sun et al. | |
| 2004/0259529 | A1 | 12/2004 | Suzuki | |
| 2005/0003841 | A1 * | 1/2005 | Salo et al. | 455/502 |
| 2005/0262419 | A1 | 11/2005 | Becker et al. | |
| 2006/0072623 | A1 * | 4/2006 | Park | 370/487 |
| 2006/0089993 | A1 | 4/2006 | Tsuruyama et al. | |
| 2006/0126668 | A1 * | 6/2006 | Kwon et al. | 370/486 |
| 2006/0209941 | A1 | 9/2006 | Kroeger | |
| 2007/0198659 | A1 | 8/2007 | Lam | |
| 2007/0237184 | A1 * | 10/2007 | Park et al. | 370/487 |

OTHER PUBLICATIONS

"Digital Radio Mondiale (DRM); Distribution and Communications Protocol (DCP)", ETSI TS 102 821, V1.2.1 (Oct. 2005), 41 pgs.

* cited by examiner

DATALINK MANAGER IN EXCITER PLATFORM

BROADCAST EQUIPMENT COMMUNICATION PROTOCOL

CROSS-REFERENCE TO RELATED APPLICATION

This application is a divisional application of U.S. patent application Ser. No. 12/100,842, filed Apr. 10, 2008, and titled "Broadcast Equipment Communication Protocol", which is hereby incorporated by reference.

FIELD OF THE INVENTION

This invention relates to broadcasting systems and, more particularly, to methods and apparatus for managing the transfer of information between components of broadcasting systems.

BACKGROUND OF THE INVENTION

The iBiquity Digital Corporation HD Radio™ system is designed to permit a smooth evolution from current analog Amplitude Modulation (AM) and Frequency Modulation (FM) radio to a fully digital In-Band On-Channel (IBOC) system. This system delivers digital audio and data services to mobile, portable, and fixed receivers from terrestrial transmitters in the existing Medium Frequency (MF) and Very High Frequency (VHF) radio bands. Broadcasters may continue to transmit analog AM and FM simultaneously with the new, higher-quality, and more robust digital signals, allowing themselves and their listeners to convert from analog to digital radio while maintaining their current frequency allocations.

The HD Radio system allows multiple services to share the broadcast capacity of a single station. One feature of digital transmission systems is the inherent ability to simultaneously transmit both digitized audio and data. Thus the technology also allows for wireless data services from AM and FM radio stations. First generation (core) services include a Main Program Service (MPS) and the Station Information Service (SIS). Second generation services, referred to as Advanced Application Services (AAS), include new information services providing, for example, multicast programming, electronic program guides, navigation maps, traffic information, multimedia programming and other content.

The HD Radio system provides a platform for the delivery of a wide range of services, both audio and data. For efficient transmission and reception of these services, it would be desirable to have a single information transfer protocol that could be used to transfer information between diverse components in an HD Radio broadcasting system.

SUMMARY OF THE INVENTION

In one aspect, the invention provides a data link manager including a User Datagram Protocol (UDP) receiver for receiving HD Radio broadcast equipment communication protocol (HDP) data or non-HD Radio broadcast equipment communication protocol (non-HDP) data using a User Datagram Protocol/Internet Protocol (UDP/IP) protocol; a Transmission Control Protocol (TCP) receiver; and a router for receiving data from the UDP receiver and the TCP receiver, for searching for a destination route in a routing table, and for forwarding the data received from the from the UDP receiver and the TCP receiver to an identified destination route.

DETAILED DESCRIPTION OF THE INVENTION

Figure 1:
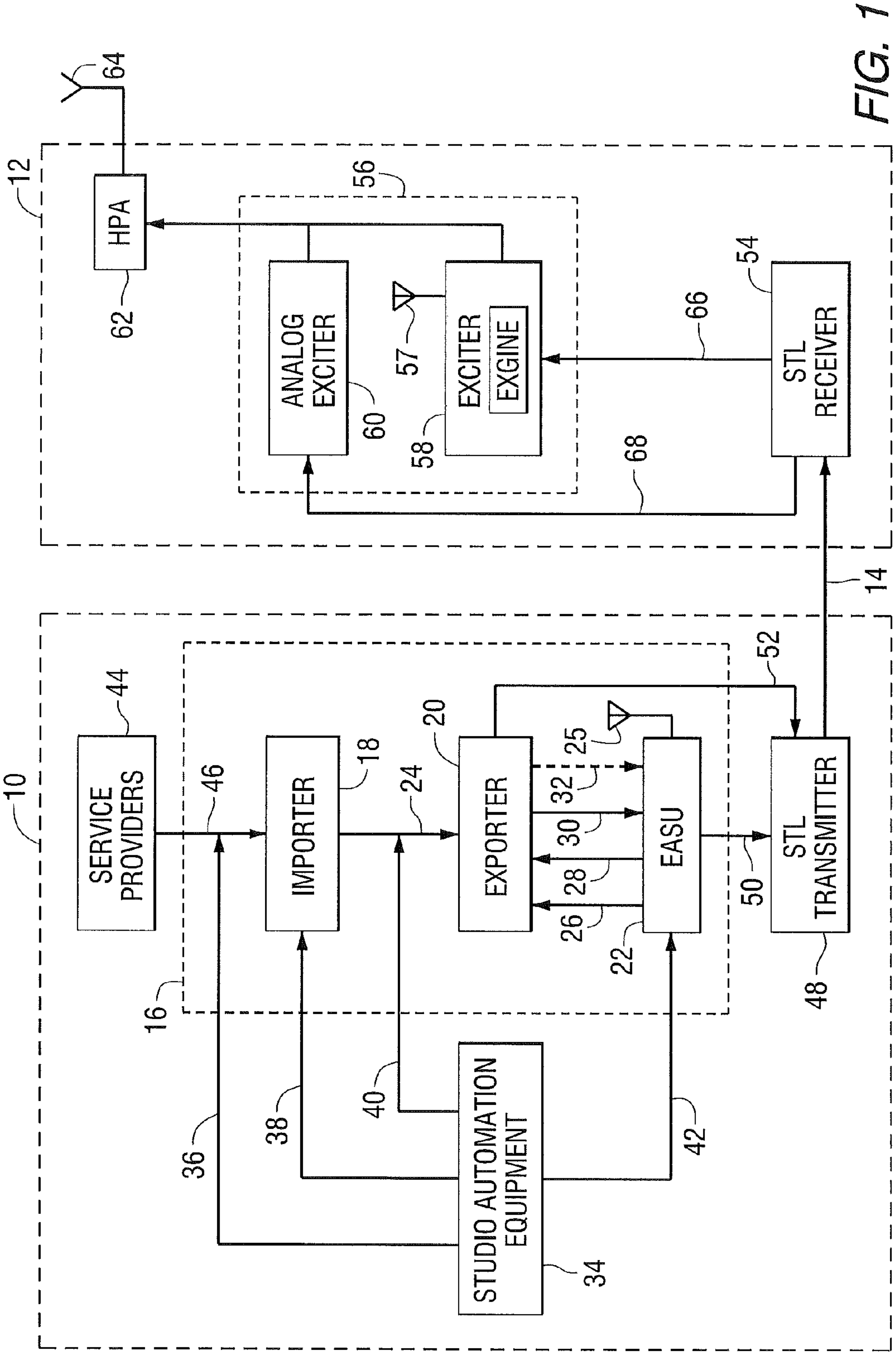
FIG. 1 is a block diagram of broadcast equipment for use in an in-band on-channel digital radio broadcasting system.

Referring to the drawings, FIG. 1 is a functional block diagram of the relevant components of a studio site 10, an FM transmitter site 12, and a studio transmitter link (STL) 14 that can be used to broadcast an FM IBOC digital audio broadcasting (DAB) signal. The studio site includes, among other things, studio automation equipment 34, an importer 18, an exporter 20, an exciter auxiliary service unit (EASU) 22, and an STL transmitter 48. The transmitter site includes an STL receiver 54, a digital exciter 56 that includes an exciter engine (exgine) subsystem 58, and an analog exciter 60. While in FIG. 1 the exporter is resident at a radio station's studio site and the exciter is located at the transmission site, these elements may be co-located at the transmission site.

At the studio site, the studio automation equipment supplies main program service (MPS) audio 42 to the EASU, MPS data 40 to the exporter, supplemental program service (SPS) audio 38 to the importer, and SPS data 36 to the importer. MPS audio serves as the main audio programming source. In hybrid modes, it preserves the existing analog radio programming formats in both the analog and digital transmissions. MPS data, also known as program service data (PSD), includes information such as music title, artist, album name, etc. The supplemental program service can include supplementary audio content as well as program associated data for that service.

The importer contains hardware and software for supplying advanced application services (AAS). A "service" is content that is delivered to users via an IBOC DAB broadcast, and AAS can include any type of data that is not classified as MPS or SPS. Examples of AAS data include real-time traffic and weather information, navigation map updates or other images, electronic program guides, multicast programming, multimedia programming, other audio services, and other content. The content for AAS can be supplied by service providers 44, which provide service data 46 to the importer. The service providers may be a broadcaster located at the studio site or externally sourced third-party providers of services and content. The importer can establish session connections between multiple service providers. The importer encodes and multiplexes service data 46, SPS audio 38, and SPS data 36 to produce exporter link data 24, which is output to the exporter via a data link.

The exporter 20 contains the hardware and software necessary to supply the main program service (MPS) and station information service (SIS) for broadcasting. SIS provides station information, such as call sign, absolute time, position correlated to GPS, etc. The exporter accepts digital MPS audio 26 over an audio interface and compresses the audio. The exporter also multiplexes MPS data 40, exporter link data 24, and the compressed digital MPS audio to produce exciter link data 52. In addition, the exporter accepts analog MPS audio 28 over its audio interface and applies a pre-programmed delay to it, to produce a delayed analog MPS audio signal 30. This analog audio can be broadcast as a backup channel for hybrid IBOC DAB broadcasts. The delay compensates for the system delay of the digital MPS audio, allowing receivers to blend between the digital and analog program without a shift in time. In an AM transmission system, the delayed MPS audio signal 30 is converted by the exporter to a mono signal and sent directly to the STL as part of the exciter link data 52.

The EASU 22 accepts MPS audio 42 from the studio automation equipment, rate converts it to the proper system clock, and outputs two copies of the signal, one digital 26 and one analog 28. The EASU includes a GPS receiver that is connected to an antenna 25. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational. The bypassed audio 32 can be fed directly into the STL transmitter, eliminating a dead-air event.

The STL transmitter 48 receives delayed analog MPS audio 50 and exciter link data 52. It outputs exciter link data and delayed analog MPS audio over STL link 14, which may be either unidirectional or bidirectional. The STL link may be a digital microwave or Ethernet link, for example, and may use the standard User Datagram Protocol (UDP) or the standard Transmission Control Protocol (TCP).

The transmitter site includes an STL receiver 54, an exciter 56 and an analog exciter 60. The STL receiver 54 receives exciter link data, including audio and data signals as well as command and control messages, over the STL link 14. The exciter link data is passed to the exciter 56, which produces the IBOC DAB waveform. The exciter includes a host processor, digital up-converter, RF up-converter, and exgine subsystem 58. The exgine accepts exciter link data and modulates the digital portion of the IBOC DAB waveform. The digital up-converter of exciter 56 converts the baseband portion of the exgine output from digital-to-analog. The digital-to-analog conversion is based on a GPS clock, common to that of the exporter's GPS-based clock, derived from the EASU. Thus, the exciter 56 can include a GPS unit and antenna 57. An alternative method for synchronizing the exporter and exciter clocks can be found in U.S. Pat. No. 7,512,175. The RF up-converter of the exciter up-converts the analog signal to the proper in-band channel frequency. The up-converted signal is then passed to the high power amplifier 62 and antenna 64 for broadcast. In an AM transmission system, the exgine subsystem coherently adds the backup analog MPS audio to the digital waveform in the hybrid mode; thus, the AM transmission system does not include the analog exciter 60. In addition, the exciter 56 produces phase and magnitude information and the digital-to-analog signal is output directly to the high power amplifier.

IBOC DAB signals can be transmitted in both AM and FM radio bands, using a variety of waveforms. The waveforms include an FM hybrid IBOC DAB waveform, an FM all-digital IBOC DAB waveform, an AM hybrid IBOC DAB waveform, and an AM all-digital IBOC DAB waveform.

The HD Radio system provides audio services including multicasting and data services. These services can be transported through the system and processed by the receiver with minimal metadata information and support. However, an increasingly large number of advanced data services including, for example: navigation based services, subscription audio services, automotive based services, mobile entertainment updates, and subscription/targeted data services may be implemented in the HD Radio system. These services can be implemented in scenarios where a single service provider might wish to deploy multiple HD Radio services.

In one aspect, this invention relates to a broadcast equipment communication protocol, called the HD Protocol (HDP), used by the components within the HD Radio Broadcast System Architecture (BSA) to communicate content, command and control information between the components.

Figure 2:
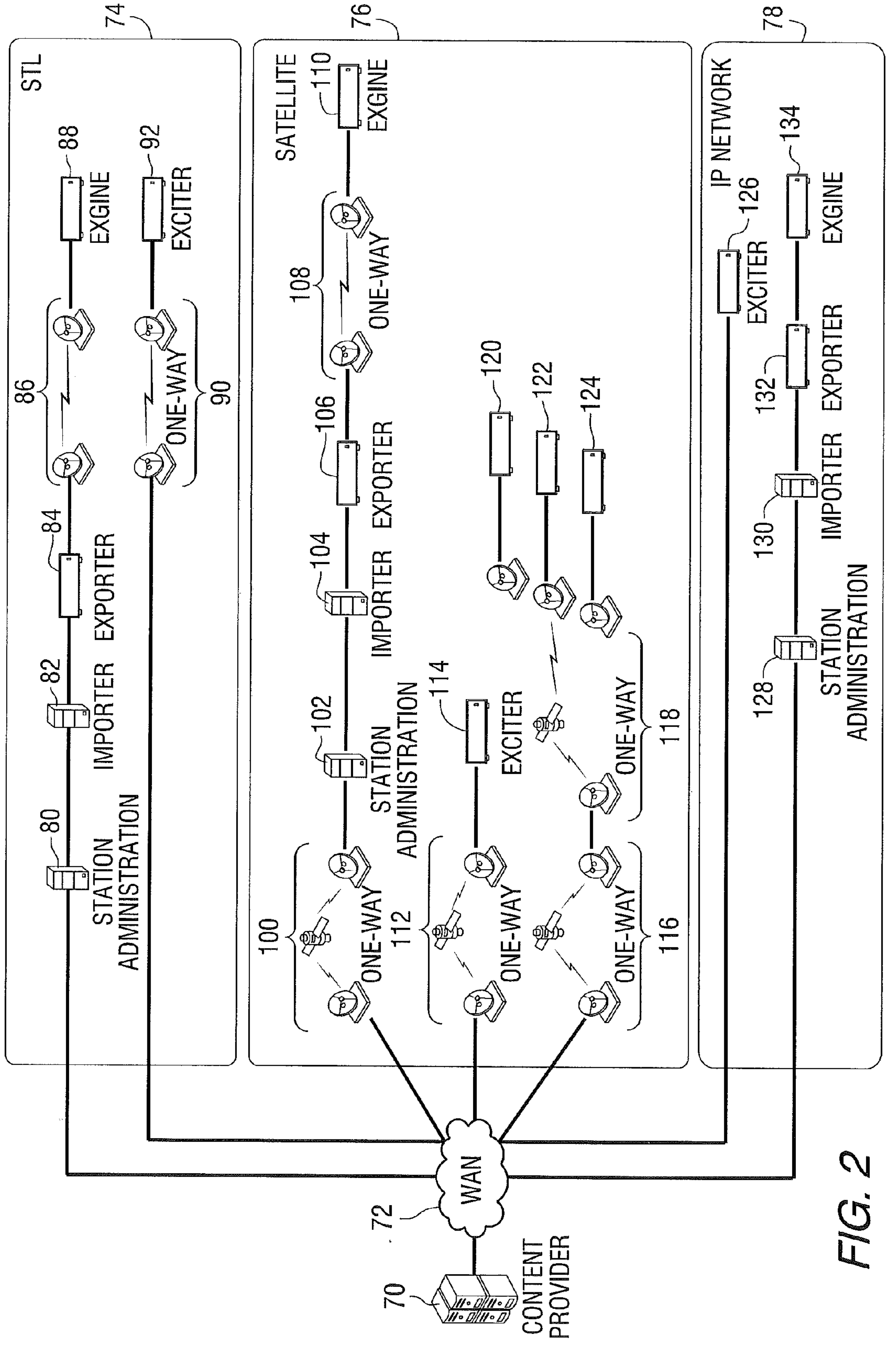
FIG. 2 is a schematic representation illustrating the general network configurations that can be supported by a broadcast equipment communication protocol in accordance with an aspect of the invention.

FIG. 2 is a schematic representation illustrating the general network configurations that can be supported by HDP. In this example, a content provider 70 supplies information to be transmitted via a wide area network 72 to transmitter sites for broadcast. The information can be conveyed to studio and transmitter sites having different equipment configurations and communication links, including a studio transmitter link (STL) 74, a satellite distribution system 76, or an Internet Protocol network 78. In the first configuration using an STL 74, information is transmitted to a studio having station administration equipment 80, an importer 82 and an exporter 84. A wireless communications link 86 is used to transmit the information to an exgine 88, which may be located remotely from the other equipment at a transmitter site. Alternatively, the information that is transmitted may pass through a wireless communications link 90 directly to an exciter 92, which may be located at a transmitter site.

In the second configuration where information is transmitted through a satellite distribution system, the information may pass through a satellite communications link 100 to a studio site having station administration equipment 102, an importer 104, and an exporter 106. A wireless communications link 108 is used to transmit the information to an exgine 110, which may be located remotely from the other equipment at a transmitter site. Alternatively, the information may pass through a satellite communications link 112 directly to an exciter 114, which may be located at a transmitter site. In another example, the information may pass through multiple satellite communications links 116, 118 to a plurality of exciters 120, 122 and 124, which may be located at a plurality of transmitter sites.

In the third configuration where information is transmitted via an IP network, the information may pass directly to an exciter 126. Alternatively, the information may pass to a studio site having station administration equipment 128, an importer 130, and an exporter 132. The information is then communicated to an exgine 134 via an IP network connection. The configurations shown in FIG. 2 are representative examples of studio and transmitter site configurations and communication links and are meant to be illustrative and non-limiting.

Figure 3:
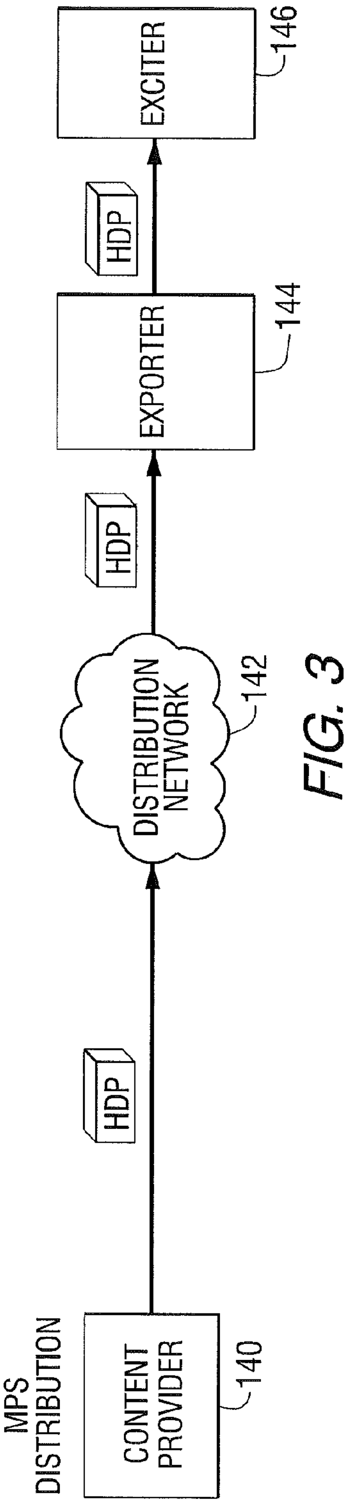
FIGS. 3 and 4 are schematic representations of broadcast system components using HDP, a broadcast equipment communication protocol.

FIG. 3 is a schematic representation of the distribution of main program service data to a transmitter site for broadcast.

In this example, a content provider 140 sends data via distribution network 142 to an exporter 144 and the exporter sends the data to an exciter 146. All communications between the equipment shown are formatted in accordance with HDP.

Figure 4:
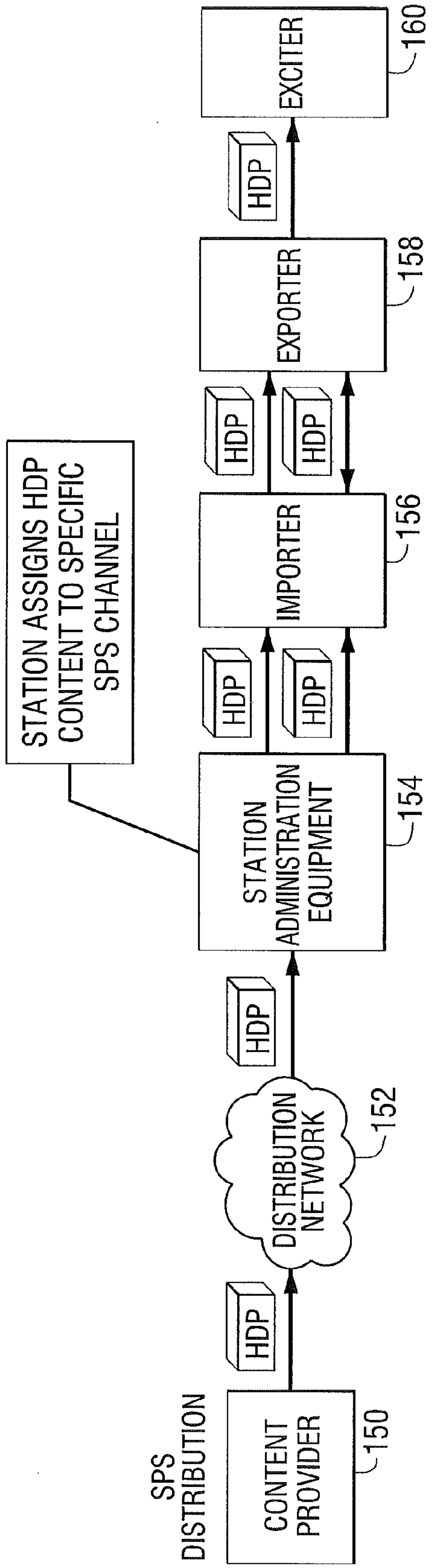

FIG. 4 is a schematic representation of the distribution of supplemental program service data to a transmitter site for broadcast. In this example, a content provider 150 sends data via a distribution network 152 to the station administration equipment 154, which assigns the content to specific SPS channels, and sends it to an importer 156. Alternatively, content can be generated locally from the station administration equipment and delivered to the importer using HDP. The delivery of HDP content to the importer may also be assigned to different SPS channels by the local station administration equipment. The importer sends the data to an exporter 158, which subsequently sends the data to an exciter 160. The exporter 158 may send configuration and control information back to the importer 156. All communications between the equipment are formatted in accordance with HDP.

In each of the examples in FIGS. 2-4, information is passed from a source component to a destination component in the broadcast system architecture. The information is formatted using HDP in the source component and included in a message that is transmitted to the destination component. The processing that is used to form the HDP message can be implemented in software and/or hardware using known processing devices or circuits. The destination component receives the transmitted message and recovers the relevant HDP formatted information. In this manner, uniform HDP formatted information is passed from one component to the next in the broadcast system architecture.

HDP incorporates some aspects of the Digital Radio Mondiale (DRM) Distribution and Communications Protocol (DCP) standard, ETSI TS 102 821, which is hereby incorporated by reference.

Figure 5:
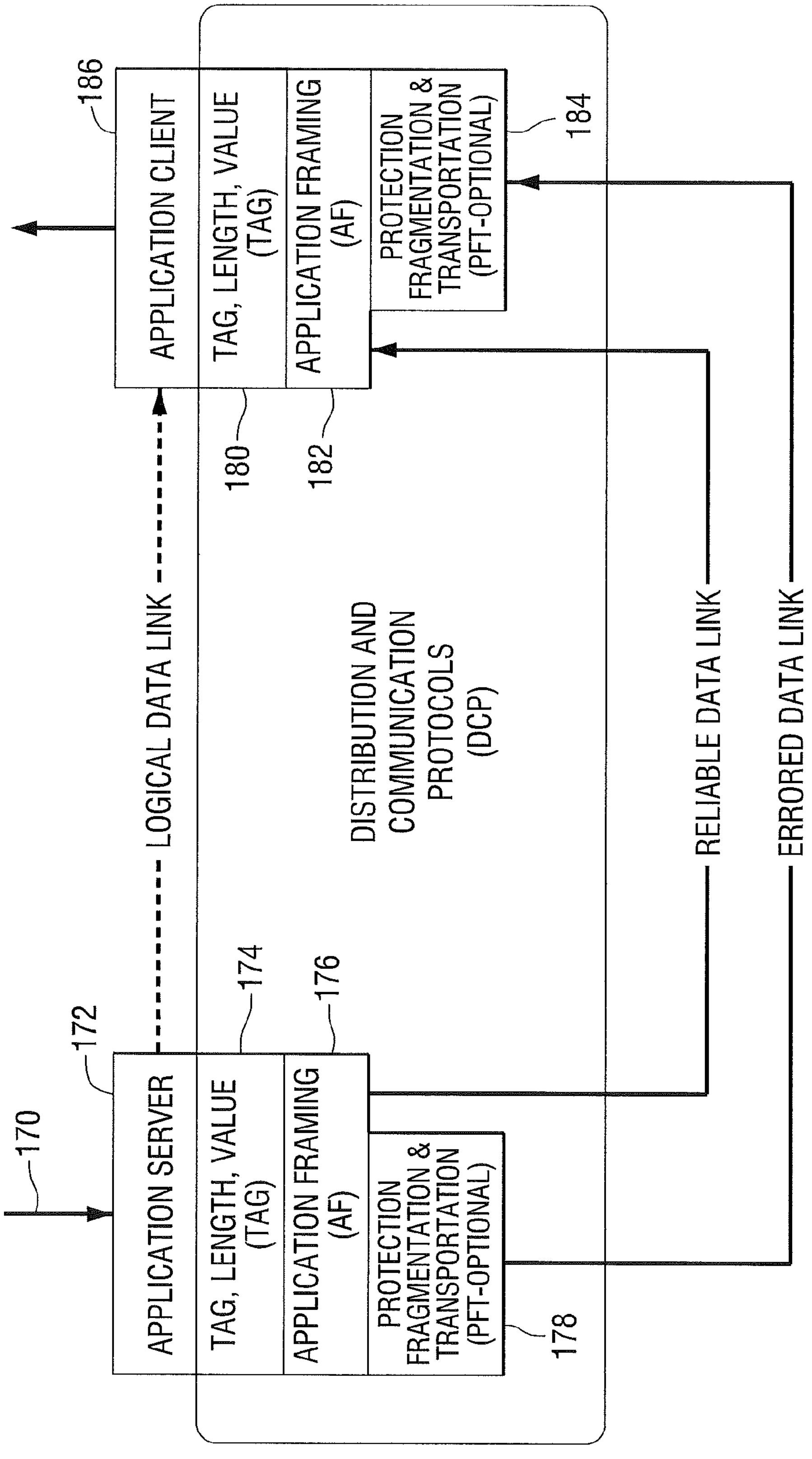
FIG. 5 PRIOR ART
FIG. 5 is a schematic diagram of a prior art protocol stack described in the ETSI TS 102 821 standard.

FIG. 5 shows a diagram of a prior art DCP protocol stack described in the ETSI TS 102 821 standard. The application data input on line 170 is carried from the transmitter to the receiver through a number of layers as shown in FIG. 5. The data at each layer is encapsulated in a series of frames in a source component to produce a message. An application server 172 sends data to a TAG Layer 174, which encapsulates the elementary arbitrary length data items, and sends the encapsulated data items to an Application Framing (AF) Layer 176, which combines the elementary data into a cohesive block of related data or message. An optional Protection, Fragmentation, and Transportation (PFT) Layer 178 allows fragmentation of the potentially large AFL frames, and adds the possibility of having addressing and Forward Error Correction (FEC). The TAG, AF and PFT Layers form the ETSI TS 102 821 DCP.

Data transmitted via the DCP and received by a destination component is processed using a similar layer structure, including a TAG Layer 180, an Application Framing (AF) Layer 182, and an optional Protection, Fragmentation, and Transportation (PFT) Layer 184 to deliver the data to an application client 186.

There are many aspects of the ETSI TS 102 821 DCP that make it suboptimal for use in HD Radio broadcast systems. The HD Protocol of the present invention corrects these suboptimal aspects and provides several advantages in the HD Radio context as compared to ETSI TS 102 821. For example, the TAG Layer in the ETSI TS 102 821 standard is not suitable for all the various payloads within the HD Radio system. In addition, the DCP of FIG. 5 does not provide any security capabilities. In order to make use of the many features of the DCP standard, add the desired security features, and make it more suitable for use in the HD Radio broadcast ecosystem. In one embodiment, HDP uses certain aspects of the DCP standard but includes additional information at the AF Layer and a redefinition of the TAG Layer.

Figure 6:
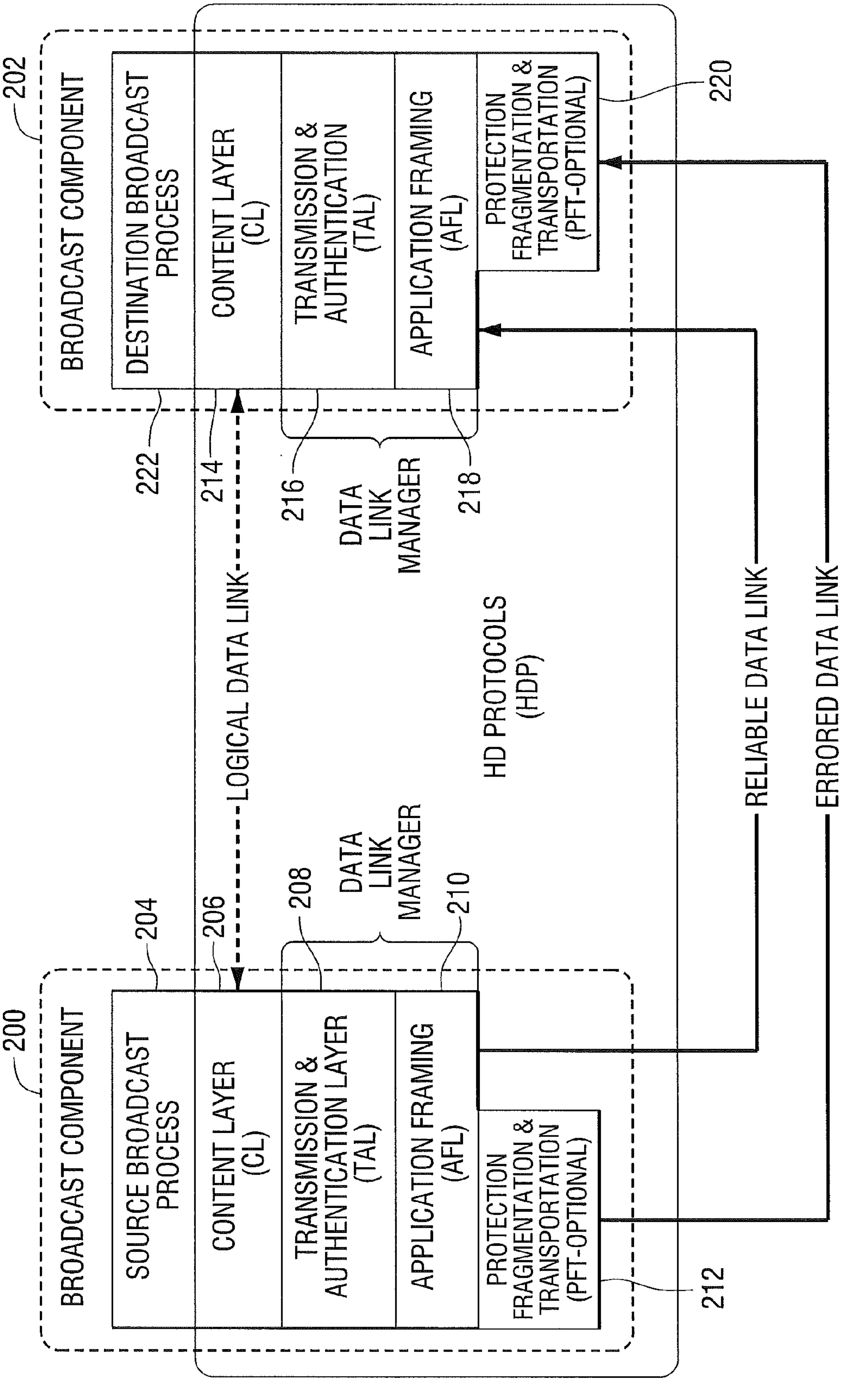
FIG. 6 is a schematic representation of a protocol stack.

FIG. 6 shows a diagram of an HDP stack for exchanging information between broadcast equipment source and destination components 200 and 202.

A source broadcast process 204 sends data to a Content Layer (CL) 206, which encapsulates the elementary arbitrary length data items, and sends the encapsulated data items to a Transmission and Authentication Layer (TAL) 208. The TAL Layer sends the data to an Application Framing Layer (AFL) 210, which combines the elementary data into a cohesive block of related data or message. An optional Protection, Fragmentation, and Transportation (PFT) Layer 212 allows fragmentation of the potentially large AFL frames, and adds the possibility of having addressing and Forward Error Correction (FEC). The PFT Layer can be used, for example, when the message is transmitted from a source component to a destination component over an unreliable, or errored, data link. When the message is transmitted from a source component to a destination component over a reliable data link, the PFT Layer may not be needed. The Content Layer, TAL Layer, AF Layer and PFT Layer form the HD Radio broadcast equipment communication protocol (HDP). The logical data link shown between the Content Layers in FIG. 6 illustrates the corresponding source and destination peer layers, and is not a physical link. There is no physical connection directly from source component CL to destination component CL.

An HDP formatted message received by a destination component 202 is processed using a similar layer structure, including a Content Layer 214, TAL Layer 216, an Application Framing (AF) Layer 218, and an optional Protection, Fragmentation, and Transportation (PFT) Layer 220 to deliver the HDP content to a destination broadcast process 222.

The formation of the various data frames in the HDP stack can be implemented using software and/or hardware, including known electronic circuitry, which can include one or more processors programmed to produce the data frames. The HDP stack brings the various broadcast system components logically closer together by defining a common interface to all communications between these components. The HDP content, also referred to as payload information, is carried from the source to the destination through a number of layers as shown in FIG. 6.

Figure 7:
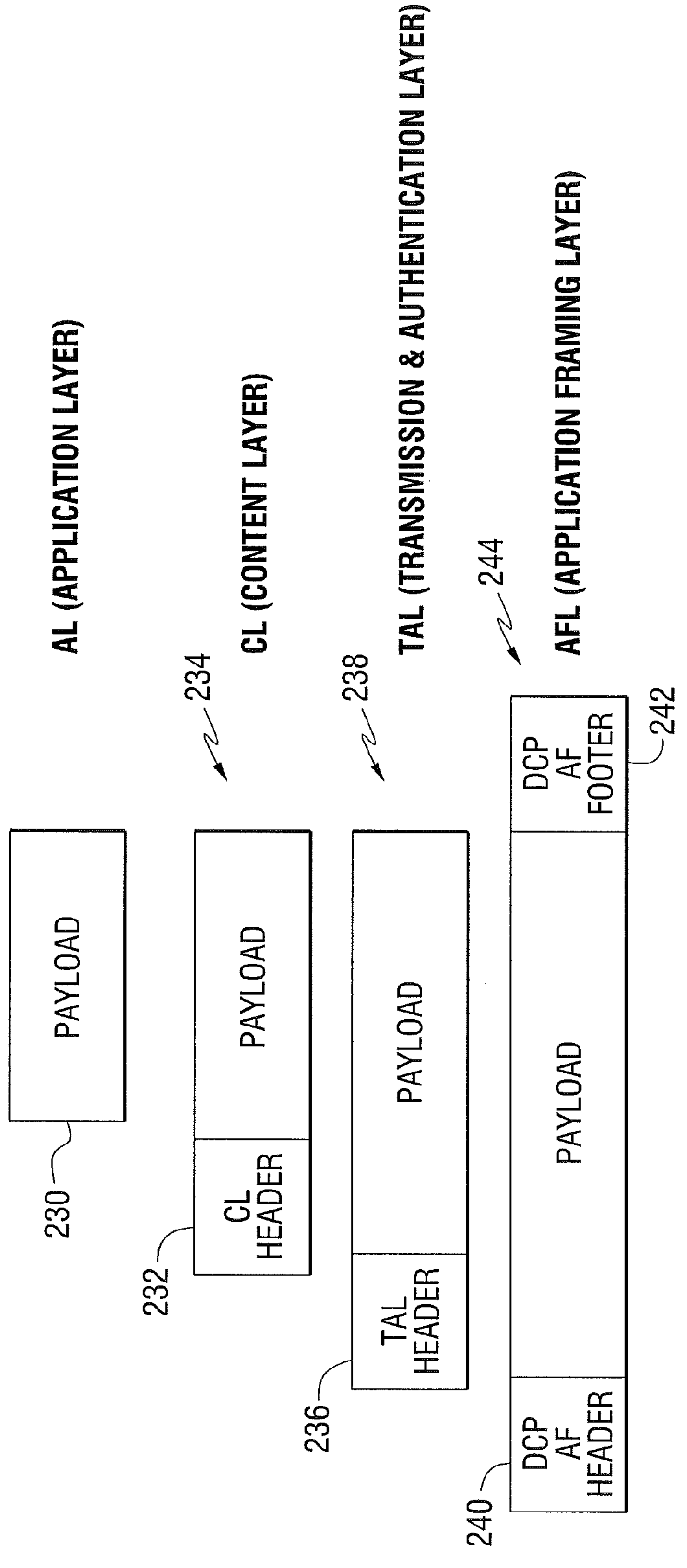
FIG. 7 is a schematic representation of an HDP stack.

The data at each layer is encapsulated in a series of frames as shown in FIG. 7. A source broadcast component provides content to be transmitted to the Application Layer, in the form of a payload 230. The Content Layer adds a Content Layer header 232 to the payload to create a Content Layer frame 234. The TAL Layer adds a TAL header 236 to the Content Layer frame 234 to create a TAL frame 238. The AF Layer adds an AF header 240 and an AF footer 242 to the TAL frame to create an AFL frame 244.

The Content Layer (CL) header is specific to the destination process but typically includes information about the payload needed by the destination process such as a message identifier, sequence number, or any special processing required.

The Transmission and Authentication Layer (TAL) header is used to authenticate the message and route the message to the appropriate process. The AF Layer (AFL) combines the elementary data into a cohesive frame of related data. The AFL header provides information about the format of the AFL payload, specifically which protocol and what revision of that protocol was used to format the payload. In addition, the AFL enables the content to be packaged and sent from one physical machine to another by providing synchronization and error detection for a specific payload or message.

The optional PFT Layer (PFTL) allows fragmentation of the potentially large AFL frames, and adds the possibility of having addressing and Forward Error Correction (FEC). The AFL frames or the PFTL fragments can then be transported by any one of a number of physical links.

In one implementation, a Data Link Manager, which can be implemented in software, controls the process that exists on the broadcast components and is responsible for processing the TAL and AFL Layers.

Figure 8:
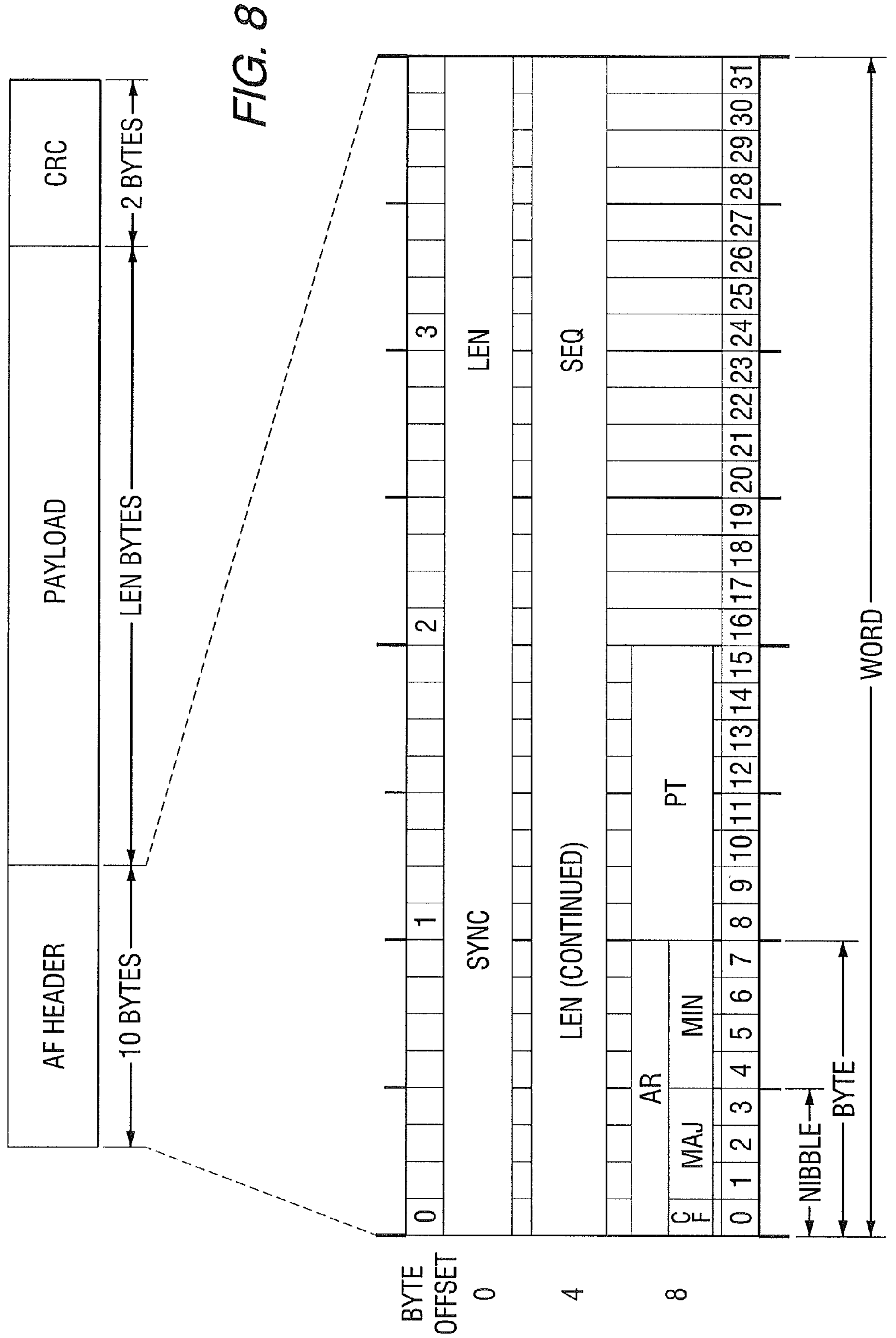
FIG. 8 is a schematic representation of an AFL frame.

The Application Framing Layer (AFL) is similar to that found in the DCP of the ETSI TS 102 821 standard. This link layer moves frames from one broadcast system to another. The basic structure of an AFL frame is shown in FIG. 8. The fields in the AFL header have the following definitions.

The SYNC field is a two-byte ASCII representation of "AF". The LEN field specifies the length of the payload, in bytes. The SEQ field includes a sequence number. The sequence number in each AFL frame is incremented by one for each frame sent, regardless of content. There is no requirement that the first frame received has a specific value.

The AR field identifies the AFL protocol revision. The AR field is a combination of the CF, MAJ and MIN fields. The CF field contains a CRC Flag, which can be 0 if the CRC field is not used or 1 if the CRC field contains a valid CRC. The MAJ field identifies the major revision of the AFL protocol in use. The MIN field identifies the minor revision of the AFL protocol.

The PT field identifies the Protocol Type. In one example the PT field comprises a single byte encoding the protocol of the data carried in the payload. In one example for TAG frames in the ETSI TS 102 821 standard, the value is the ASCII representation of "T". In one example for HDP frames, the value is the ASCII representation of "i".

In one example the CRC field contains a CRC calculated CRC code if the CF field is 1, otherwise it contains a predetermined value, such as 000016.

In one example, the HDP uses the above definition of the AF Layer with a different Protocol Type (PT) defined. For this example of the HDP frames, the value is the ASCII representation of "i". The CRC is only calculated over the payload and does not include the AFL header.

The implementation of the Cyclic Redundancy Check codes (CRC-codes) allows the detection of transmission errors at the destination.

In one example, the CRC code is defined by a polynomial of degree n:

$$G(x)=x^n+g_{n-1}x^{n-1}+\ldots+g_2x^2+g_1x+1$$

with n≥1, and $$g_i\in\{0,1\},\ i=1\ldots n-1.$$

Figure 9:
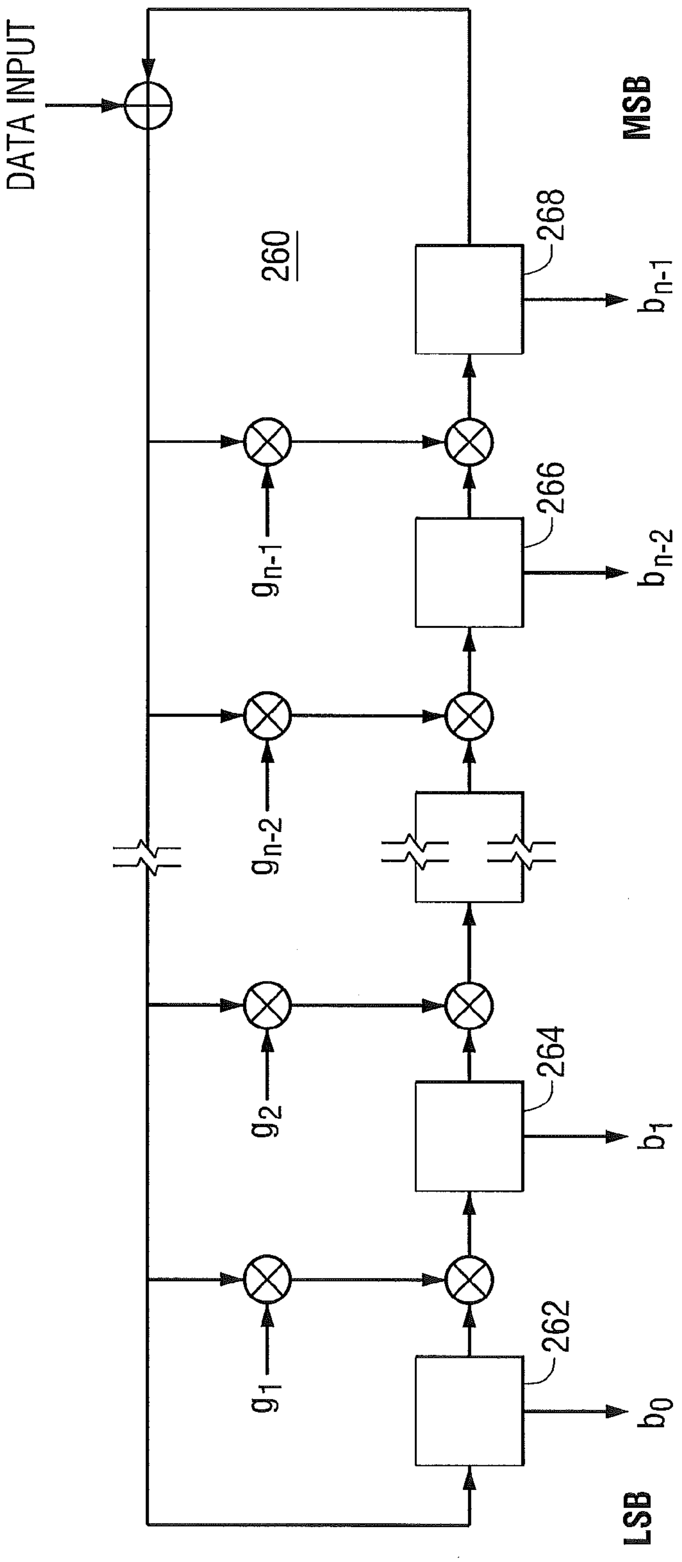
FIG. 9 is a schematic diagram of a shift register.

The CRC calculation may be performed by means of a shift register containing n register stages, equivalent to the degree of the polynomial. An example of a shift register is shown in FIG. 9. The shift register 260 includes a plurality of stages 262, 264, 266 and 268. The stages are denoted by $b_0 \ldots b_{n-1}$, where $b_0$ corresponds to 1, $b_1$ to x, $b_2$ to $x^2$, $b_{n-1}$ to $x^{n-1}$. The shift register is tapped by inserting XORs at the input of the stages, where the corresponding coefficients $g_i$ of the polynomial are "1".

At the beginning of the CRC calculation, all register stage contents are initialized to all ones. After applying the first bit of the data block (MSB first) to the input, the shift clock causes the register to shift its contents by one stage towards the MSB stage ($b_{n-1}$), while loading the tapped stages with the result of the appropriate XOR operations. The procedure is then repeated for each data bit. Following the shift after applying the last bit (LSB) of the data block to the input, the shift register contains the CRC word, which is then read out. The data and CRC words are transmitted MSB first.

In one example, the CRC is inverted (1's complemented) prior to transmission. The generator polynomial $G(x)=x^{16}+x^{12}+x^5+1$ is used. If the CRC is appended to the original data, a second CRC calculated over the entire length will result in the constant $1D0F_{16}$.

Figure 10:
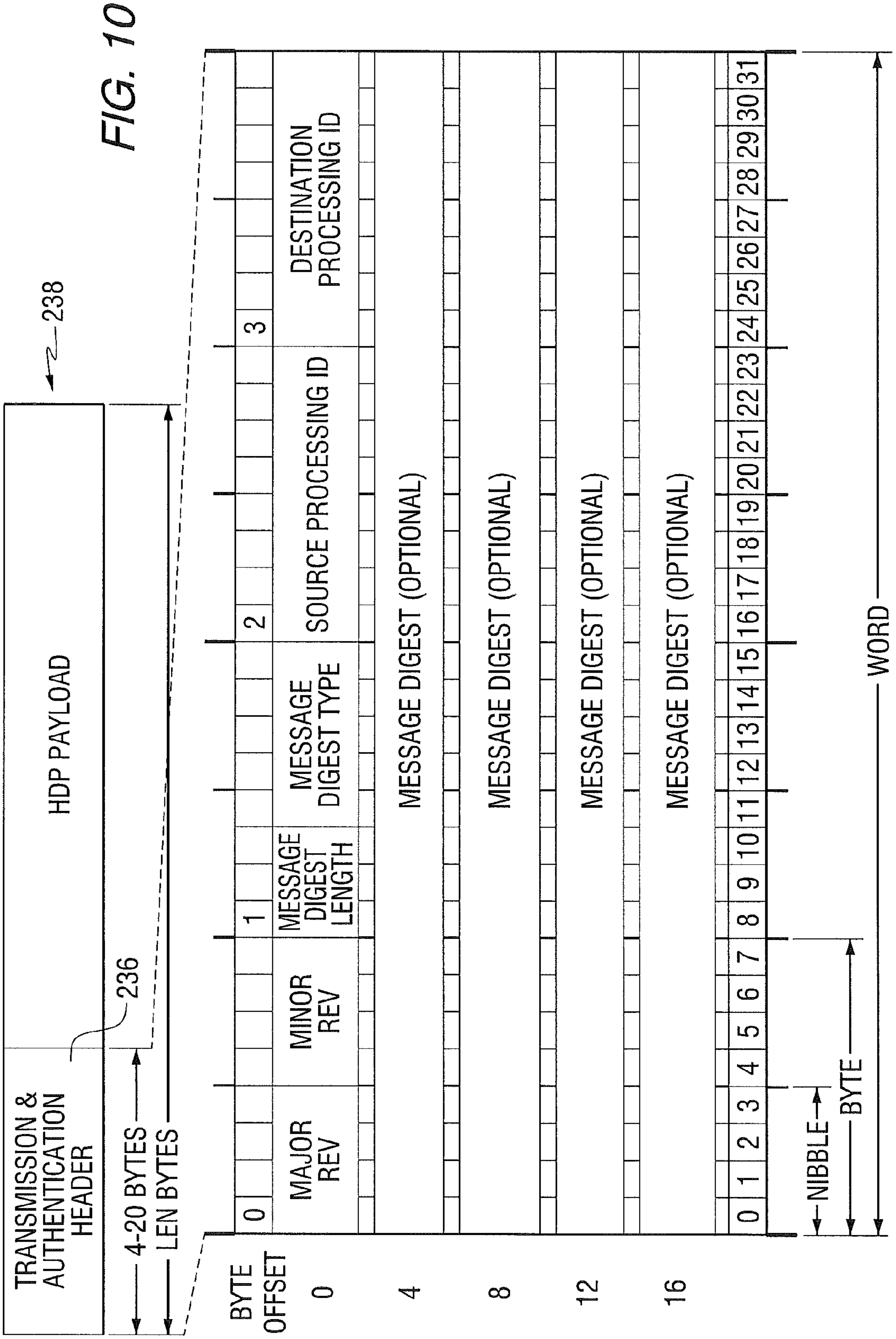
FIG. 10 is a schematic representation of a TAL frame.

The Transmission and Authentication Layer (TAL) authenticates data received from the AFL and does routing to different processes in the same broadcast component. When the Protocol Type is defined to be "i", the data in the AFL payload is defined as shown in FIG. 10. It is used to authenticate the identity of the source of the HDP message and determines which broadcast component should receive the AFL payload.

In one embodiment, the authentication works as follows. A certain type of "hash" value, identified by a Message Authentication Code (MAC) type, is computed on the payload. This hash value is then encrypted using a private key of a public key encryption method and placed in the MAC field. The length of the MAC is specified by the MAC length field. To verify the identity of the payload, the receiver of the payload decodes the MAC using the public key of the public key encryption method, and then computes the hash using an appropriate method (identified by MAC type) and compares the two values. If they are the same, the payload has not been tampered with. A recipient of a payload can choose not to perform the authentication step and just pass the payload to the appropriate application based on the payload type.

The Source and Destination Processing IDs are used to identify the various originating and end points for the HDP payloads independent of the underlying reliable or non-reliable protocols. Table 1 shows the various source and destinations and their assigned IDs.

TABLE 1

Source and Destination IDs

| Source and/or Destination Name | ID (Hex) | Description |
|---|---|---|
| Data Link Manager | 0x00 | These messages originated or are destined for the data link manager |
| Program Content Transmission | 0x01 | These messages originated or are destined for a Content Transmission process and typically contain HD content such as PSD or audio |
| Program Content Receiver | 0x02 | These messages originated or are destined for a Content Receiver process and typically contain HD content such as PSD or audio |
| Exgine | 0x03 | These messages originated by or are destined for the host process on the Exgine |
| Exporter Host | 0x04 | These messages are either originated by the Exporter Host processes or must be digested by the Exporter Host |
| Embedded Exporter Core | 0x05 | These messages are either originated by the Embedded Exporter core (chip/library) or must be digested by the Embedded Exporter core. |
| Importer Administration | 0x06 | These messages are either originated by the Importer Administration process or destined for the Importer Administration process |
| Importer Data | 0x07 | These messages are either originated by the Importer data process or destined for |

TABLE 1-continued

| Source and Destination IDs | | |
|---|---|---|
| Source and/or Destination Name | ID (Hex) | Description |
| | | the Importer data process |
| iBiquity Reserved | 0x08-0x7F | Reserve by iBiquity for future expansion |
| Unused Process | 0x80-0xFE | Unused process IDs |
| HDP Reserved | 0xFF | Reserved by HDP |

FIG. 10 is a schematic representation of a Transmission and Authentication Layer frame and illustrates each of the fields in the Transmission and Authentication Layer Header 236. The Major Rev field identifies the major revision of the HDP-TAL protocol in use. The Minor Rev field identifies the minor revision of the HDP-TAL protocol in use. The Message Digest Length field specifies the length of the hash value used as the Message Digest in units of words (4 bytes). If the length is zero, no authentication is available.

The Message Digest Type field identifies the hash algorithm used to compute the Message Digest. The Source Processing ID identifies the source of the HDP message. It contains one of the values in Table 1. The Destination Processing ID identifies the destination of the HDP message. It contains one of the values in Table 1. The Message Digest is the hash value computed on the payload.

Figure 11:
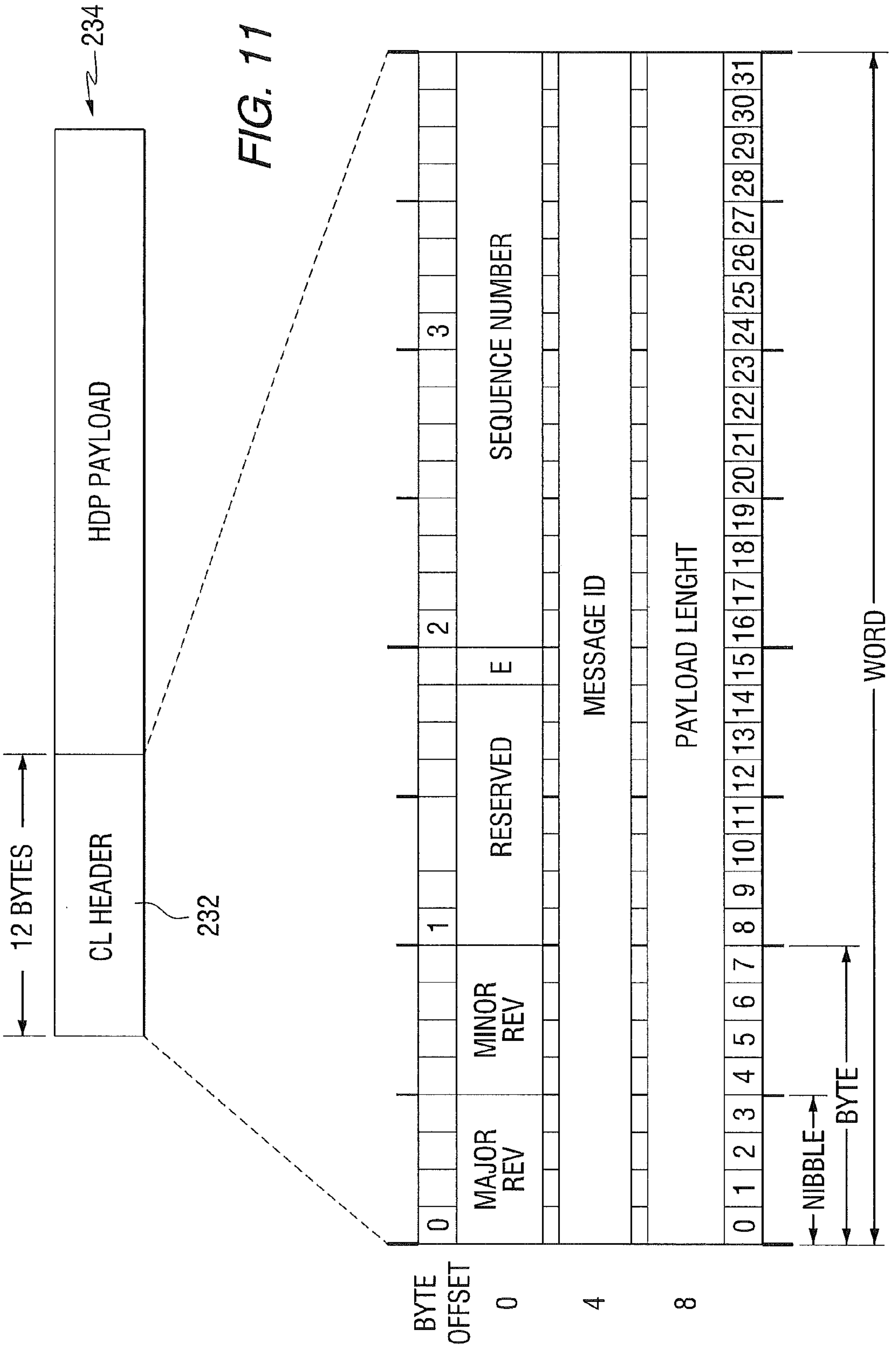
FIG. 11 is a schematic representation of a CL frame.

FIG. 11 is a schematic representation of a Content Layer frame and illustrates each of the fields in the Content Layer Header 232. The Content Layer (CL) identifies the payload or data being transferred between the source and destination processes specified in the TAL header. It also includes a sequence number for that specific payload, so the applications can determine if a specific payload is lost or corrupted, as well as an indication as to whether or not the payload has been encrypted.

The Content Layer Header includes the following fields: Major Rev; Minor Rev; Reserved; E; Sequence Number; Message ID; and Payload Length. The Major Rev field identifies the major revision of the HDP-CL protocol in use. The Minor Rev field identifies the minor revision of the HDP-CL protocol in use. The Reserved field is reserved for future use. The E field is a one bit flag used to indicate to the destination process that the payload has been encrypted.

The Sequence Number field contains a sequence number. The sequence number is incremented by one for each message sent, regardless of content. There is no requirement that the first frame received has a specific value. In one embodiment, a counter wraps from $FFFF_{16}$ to $0000_{16}$, thus the value count would be: $FFFE_{16}$, $FFFF_{16}$, $0000_{16}$, $0001_{16}$, etc. The Message ID field is used to identify the unique message being transferred. The Payload Length field specifics the length of the payload in bytes.

Figure 12:
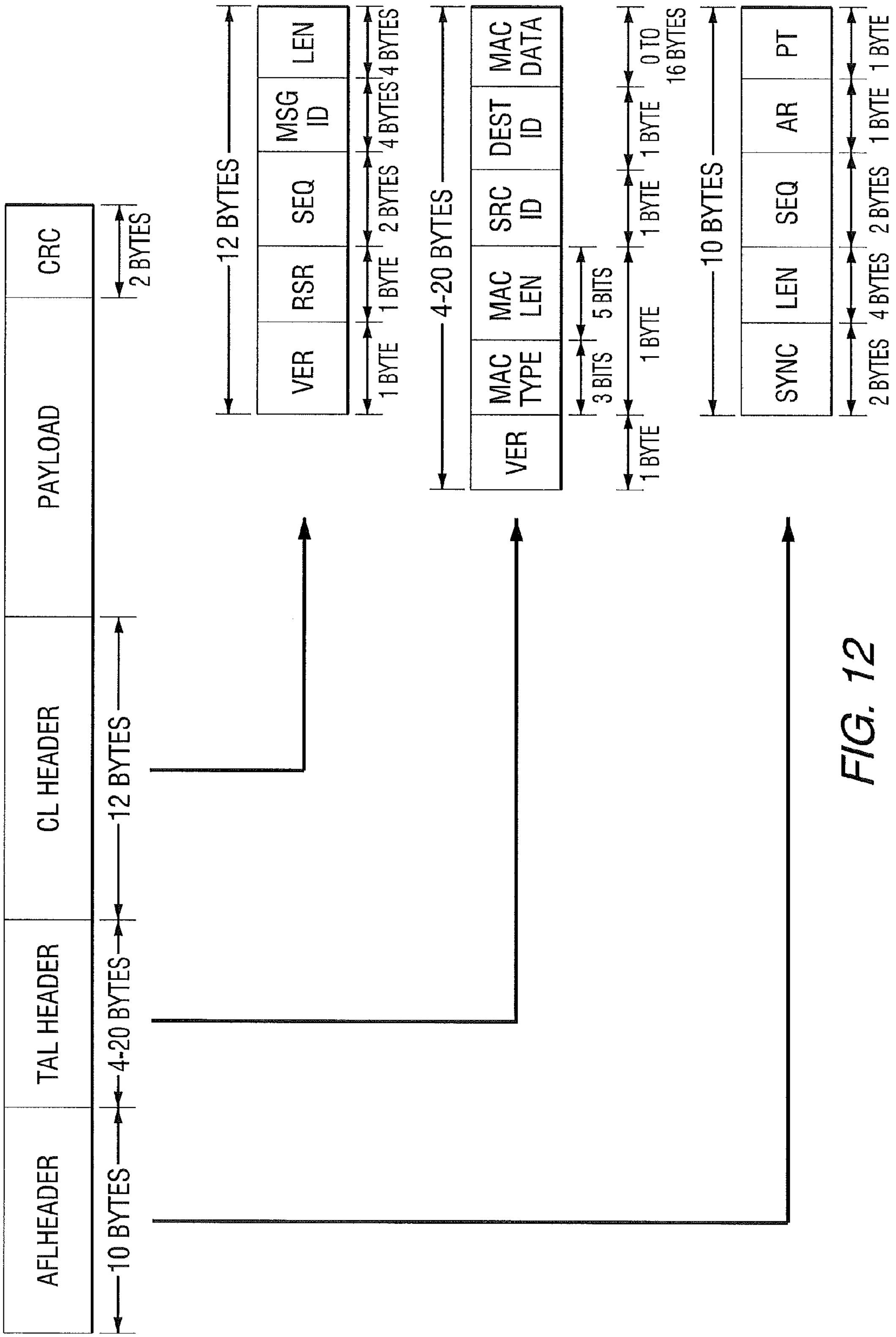
FIG. 12 is a schematic representation of a complete HDP frame.

Any information or content transmitted using HDP is called application data. An example of an entire HDP message is shown in FIG. 12. The message is comprised of an AFL header, TAL header, CL header, content payload or application data and CRC, as described above with respect to FIGS. 8-11.

Figure 13:
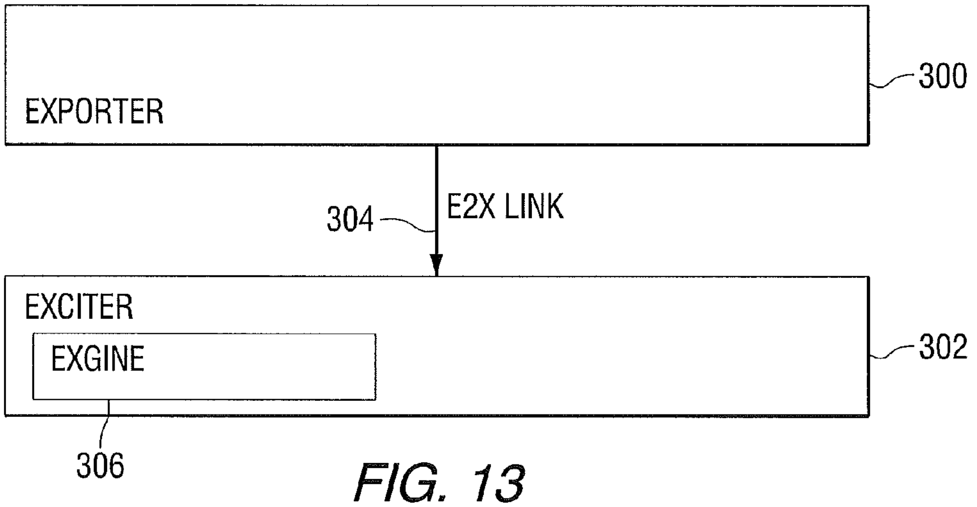
FIG. 13 is a block diagram of an exporter and an exciter.

In one aspect, HDP can be used to transfer data between an exporter 300 and an importer 302 via an E2X link 304 in a broadcast system architecture, as shown in FIG. 13. Normally, the exporter is resident at a radio station's studio and the exciter is located at the transmission site, although nothing prohibits them from being collocated at the same site. The interface between the exporter and exciter may be bidirectional or unidirectional (usually over a digital Studio Transmitter Link (STL)) using an Ethernet as the underlying communication mechanism.

The exporter can be a Pentium/Linux based system, which contains the software and hardware required for the Main Program Service (MPS) and the Station Information Service (SIS). In one embodiment, the exporter accepts analog and digital audio over an Audio Interface, compresses the audio, and outputs the compressed audio to the exciter over the unidirectional E2X Link.

The exciter contains the exgine Subsystem 306 and the hardware required to produce the HD Radio waveform. All interfacing between the exporter and exgine occurs over the E2X Link. The E2X Link messages contain the logical channel data to be modulated by the exgine, as well as appropriate command and control needed between the exporter and exgine.

Data Link Manager

The Data Link Manager (DLM) can be implemented as a common piece of software that resides on each platform (i.e., importer or exporter platforms) of the HD Radio broadcast system architecture. The DLM provides a common communication package that implements the fundamental communication protocols used by each platform to communicate with one another.

In one embodiment, the data link manager can be implemented using an Adaptive Communications Environment (ACE) framework. The Adaptive Communication Environment is a freely available, open-source object-oriented framework that implements many core patterns for concurrent communication software. ACE provides a rich set of reusable C++ wrapper facades and framework components that perform common communication software tasks across a range of OS platforms. The communication software tasks provided by ACE include event demultiplexing and event handler dispatching, signal handling, service initialization, interprocess communication, shared memory management, message routing, dynamic (re)configuration of distributed services, concurrent execution and synchronization.

Figure 14:
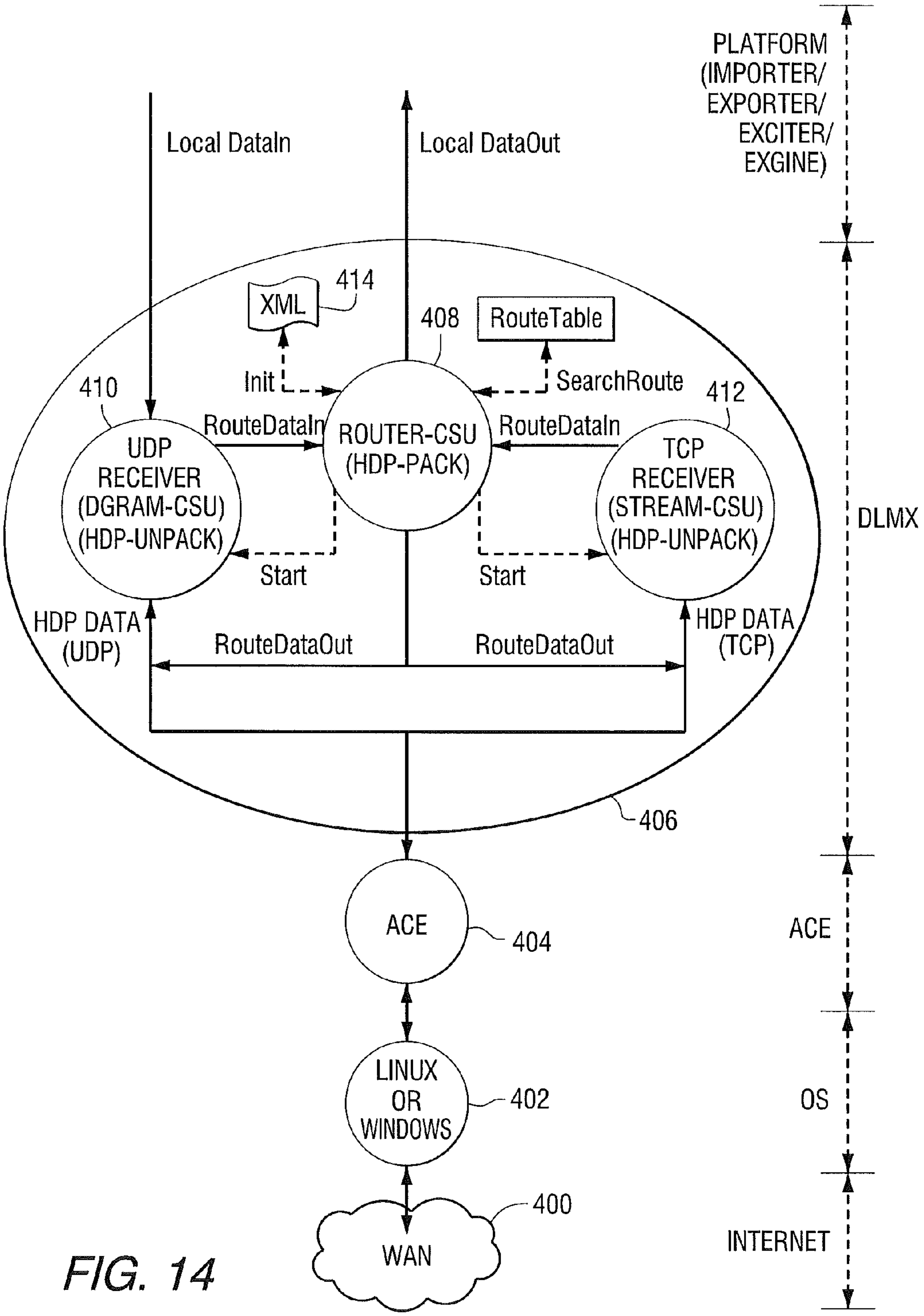
FIG. 14 is a diagram illustrating data flow in a data link manager.

In one embodiment, the Data Link Manager comprises platform independent routing software that routes data from one broadcast system to another using ACE and HD Protocol (HDP). FIG. 14 is a diagram illustrating data flow in a data link manager. In the example of FIG. 14, data can be transmitted on a wide area network 400, which could be the Internet, to a host 402, which can operate using a Linux or Windows operating system (OS). The data is then communicated through an Adaptive Communication Environment (ACE) 404 to a Data Link Manager 406.

The DLM includes four main Computer Software Units (CSUs):

1. Router 408.
2. UDP Receiver 410.
3. TCP Receiver 412.
4. Configuration Database 414.

The Router CSU receives data from UDP and TCP receiver CSUs, searches for a destination route in the routing table, and forwards the data to the destination route. If the destination route is an HDP link, then the Router CSU formats the received data according to HDP and forwards it. If the destination route is not found in the routing table or the link is down, then the data is dropped with a failure message.

The UDP Receiver receives an HDP frame using a User Datagram Protocol/Internet Protocol (UDP/IP). It unpacks HDP frame, and verifies AFL CRC and AFL sequence number. If an HDP frame is received out-of-order, then a reordering algorithm can be applied to recover it.

In one example, a reordering algorithm performs the following steps:

1. Receive HDP message from an HDP link.
2. Verify the AFL 16 bit Cyclic Redundant Checksum (CRC).
3. Verify the received HDP AFL frame sequence number.
4. Reorder out-of-order HDP AFL frames (based on the sequence number).

The following process reorders out-of-order frames using a queue (named "udp-reorder queue"). The process receives an HDP message and compares the received HDP AFL frame's CRC value with a locally calculated CRC value to make sure that the frame is not corrupted. If it is not corrupted, it then checks the HDP AFL frame sequence number with an expected sequence number which is a locally incremented 16 bit number for every HDP AFL frame successfully received. The sequence number is unique to each HDP AFL frame received on a particular link between two pieces of broadcast equipment. If the received HDP AFL frame sequence number is the same as the expected sequence number, then it unpacks the HDP AFL frame and routes the received data to its local destination process and increments the Expected Sequence Number for the next AFL frame for that link.

If the received HDP AFL sequence number and expected sequence number do not match (i.e., it is out-of-order), the process then checks the difference between the two sequence numbers to make sure that it can be reordered.

If the difference is less than a predetermined maximum reorder depth (udp-reorder-depth) which directly implies that it can reorder only that many numbers of out-of-order frames, then the HDP message is placed in the reorder queue where it is held until the correct order is determined. The waiting period also depends on the reorder queue's udp-reorder-depth value.

Figure 15:
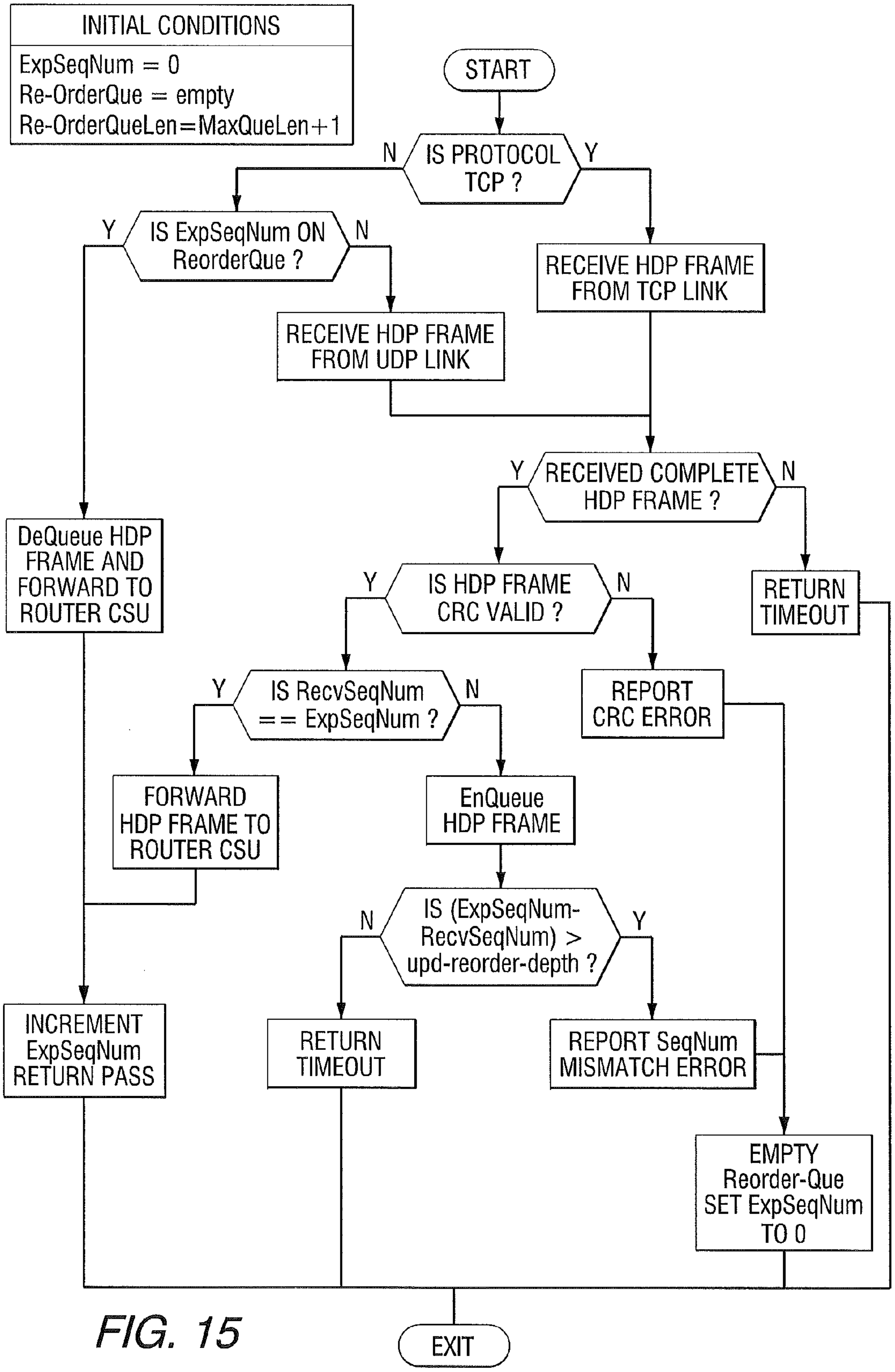
FIG. 15 is a flow chart of a reordering process.

FIG. 15 is a flow chart of a reordering process.

The following examples show how the reorder algorithm works for various cases. For purposes of this description, assume:

1. HDP is being used between an exporter and an engine via the E2X link. The underlying communications on the E2X uses UDP.
2. The HDP sequence number starts with 0x1010.
3. The Expected Sequence Number is 0x1010.
4. The udp-reorder-depth is 4.

For a Normal Example, assume that the E2X HDP link receives HDP AFL frames in the following order:

0x1010, 0x1011, 0x1012, 0x1013, 0x1014, 0x1015, 0x1016, 0x1017, 0x1018, 0x1019, 0x101A.

In this case, the sequence number for the first HDP AFL frame received from the link is 0x1010, which is equal to Expected Sequence Number 0x1010. Then the receiver unpacks the HDP package, routes the data to a local destination process, and increments the Expected Sequence Number to 0x1011. When the receiver receives the next HDP AFL frame from the same link, it receives 0x1011 and the Expected Sequence also the same. Thus the receiver continuously receives all the HDP frames without any problem.

For a Reorder Example in which it is possible to reorder the frames, assume that the HDP link receives the HDP frame in the following order:

0x1010, 0x1011, 0x1012, 0x1013, 0x1014, 0x1016, 0x1017, 0x1018, 0x1015, 0x1019, 0x101A.

In this example, the HDP frame with sequence number 0x1015 is out-of-order. The receiver receives the 0x1010, 0x1011, 0x1012, 0x1013 and 0x1014 sequence numbers without any problem. After receiving the sequence number 0x1014 successfully, it returns the 0x1014 frame to the destination process and increments the Expected Sequence Number to 0x1015. Next, the 0x1016 frame will be received from the HDP link Since the HDP sequence number of 0x1016 is not equal to Expected Sequence Number 0x1015 and the difference between received sequence number and Expected Sequence Number is 1, which is less than the udp-reorder-depth (4), the received frame is added to the reorder queue. Similarly, frames 0x1017 and 0x1018, whose sequence number difference is 2 and 3 which is also less than the udp-reorder-depth (4), are added to the reorder queue.

At this point, the reorder queue has three HDP frames with sequence numbers 0x1016, 0x1017 and 0x1018. On the next receive, the 0x1015 frame will be received from the HDP link. Now the received frame sequence number becomes 0x1015, which is equal to Expected Sequence Number. So the receiver unpacks that HDP frame, returns data to the local destination process, and increments the Expected Sequence Number to 0x1016. On a next receive from the HDP link, it retrieves the Expected Sequence Number 0x1016 frame from the reorder queue. Similarly, the frames having sequence numbers 0x1017 and 0x1018 are retrieved from the reorder queue.

For a Reorder Example in which it is impossible to reorder the frames, assume that from the HDP link, a broadcast equipment component receives HDP frames in the following order:

0x1010, 0x1011, 0x1012, 0x1013, 0x1014, 0x1016, 0x1017, 0x1018, 0x1019, 0x101A, 0x1015.

In this example, the HDP frame with sequence number 0x1015 is out-of-order for more than the maximum reorder depth 4 (means 0x1015 frame arrives after 0x101A). Similar to the previous example, the sequence numbers 0x1016, 0x1017, 0x1018, 0x1019 are en-queued in the reorder queue without any problem. But when the receiver receives 0x101A from the HDP link, the difference between received sequence number (0x101A) and Expected Sequence Number (0x1015) exceeds the reorder-depth (4), so the receiver logs a sequence number mismatch error, empties the reorder queue, and sets the Expected Sequence Number to the received HDP frame's sequence number.

After reordering, the validated application data is forwarded to the Router CSU to deliver it to the broadcast destination component. The Router CSU is also responsible for monitoring all active HDP links and routing HDP frames to multiple destinations. For example, one exporter broadcast component can route data to multiple exgine broadcast components.

The TCP Receiver performs a function similar to the UDP Receiver CSU, except that it receives an HDP frame using the reliable TCP/IP protocol and the unpacked HDP frame forwarded to Router CSU. Due to TCP/IP's reliable and guaranteed delivery characteristics, the HDP frame received by TCP Receiver is always delivered in correct order.

The Configuration Database is an XML data file, and provides the necessary link and routing information for all HD Radio broadcast system platforms (i.e., the importer, exporter, exciter and exgine). Using this information, the DLM builds a routing table and it is used to route the data to its broadcast destination component. The configuration database keeps all the link information such as protocol information (UDP or TCP), udp-reorder-depth, and link retry timeout (i.e., if HDP link is broken due to a network problem or data inactivity, then the retry timeout specifies how often the DLM should retry to establish the link).

Figure 16:
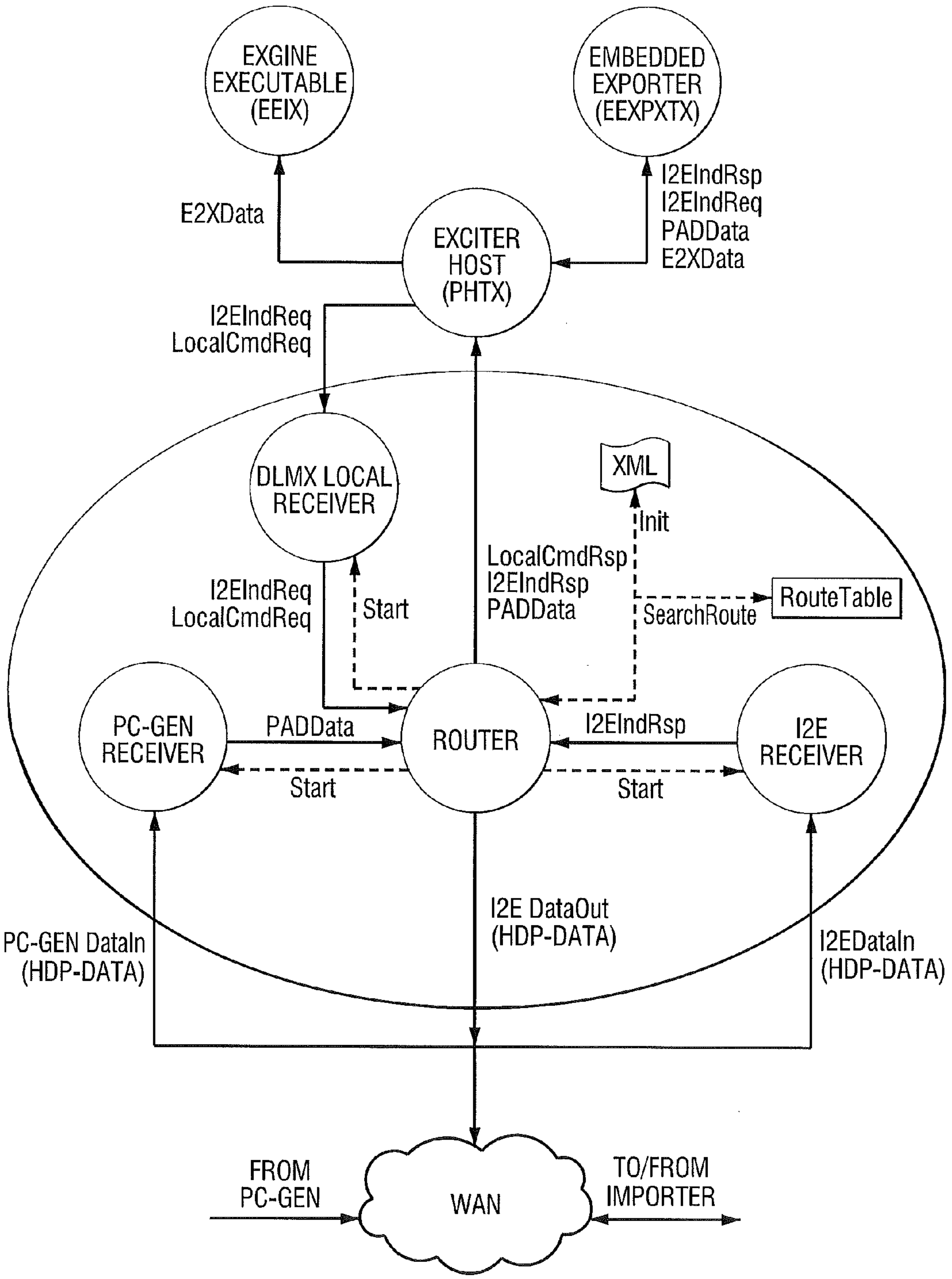
FIG. 16 is a diagram illustrating data flow in an exciter.

FIGS. 16-19 are schematic representations of DLM software running in different HD Radio broadcast platforms. As illustrated in FIG. 16, the DLM in Exciter platform receives HDP frames from two broadcast components, i.e., the importer and program content generator. The DLM receives secondary audio and data HDP frames from the importer on an I2E Receiver link, and MPS PAD HDP frames from the program content generator on a PC-Gen Receiver link. The I2E Receiver link is an instance of the DLM TCP Receiver CSU, and the PC-Gen Receiver link is an instance of DLM UDP Receiver CSU.

Figure 17:
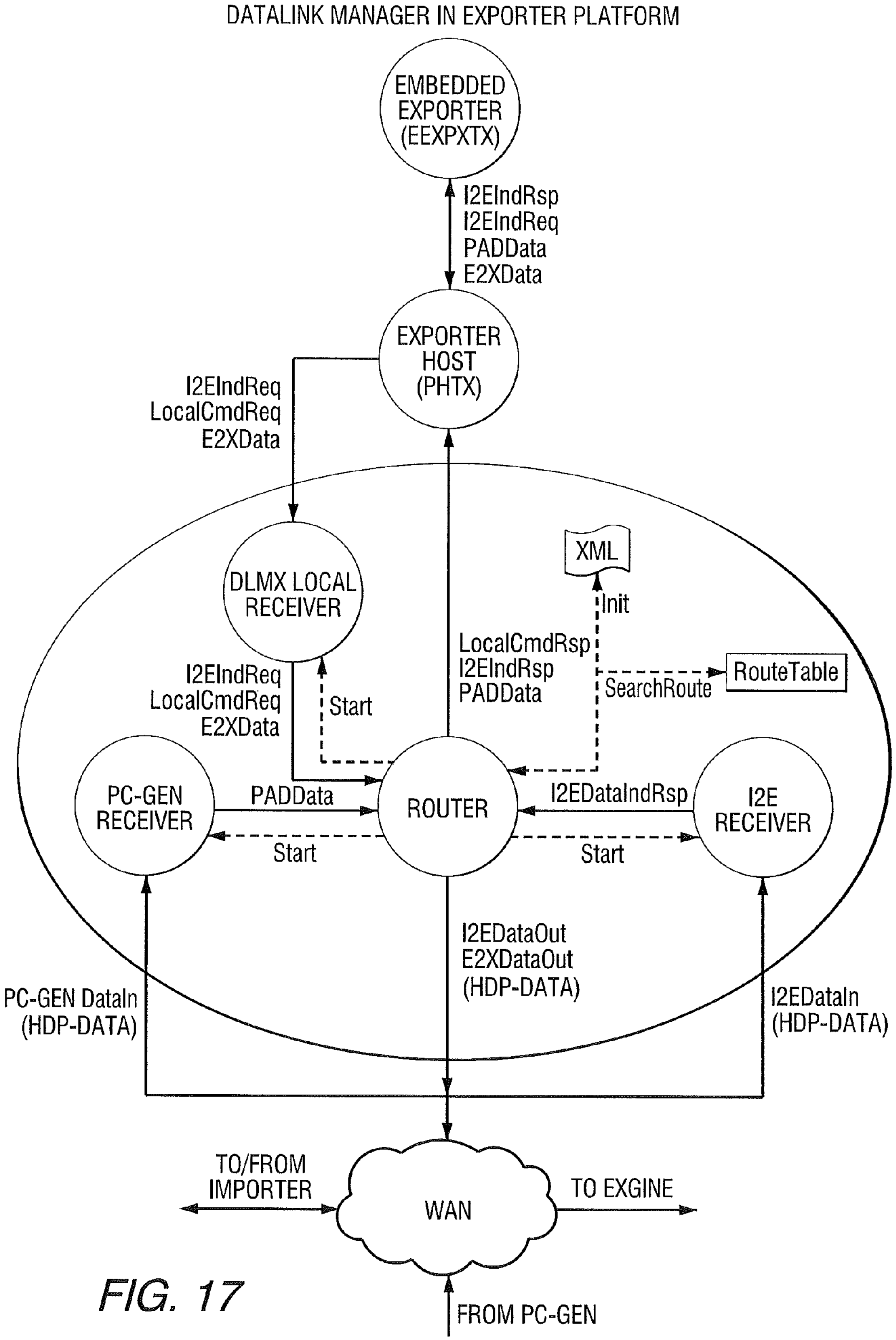
FIG. 17 is a diagram illustrating data flow in an exporter.

FIG. 17 shows that the DLM in the Exporter platform performs the same functionality as the DLM in the exciter platform and also sends exgine HDP frames to the exgine broadcast component.

Figure 18:
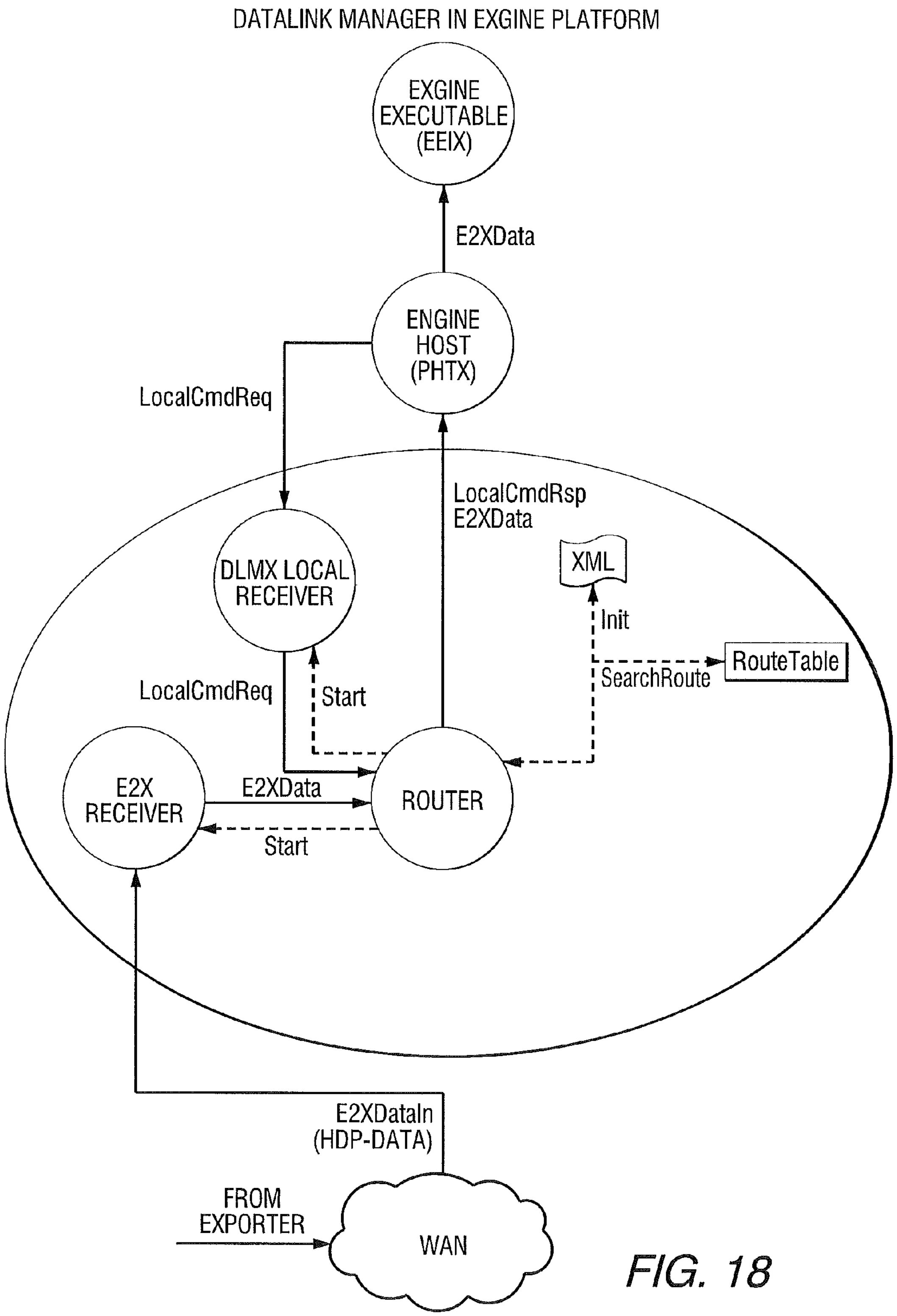
FIG. 18 is a diagram illustrating data flow in an exgine.

FIG. 18 shows that the DLM in the Exgine platform receives exgine HDP frames from the exporter on an E2X Receiver link which is an instance from DLM UDP Receiver CSU.

Figure 19:
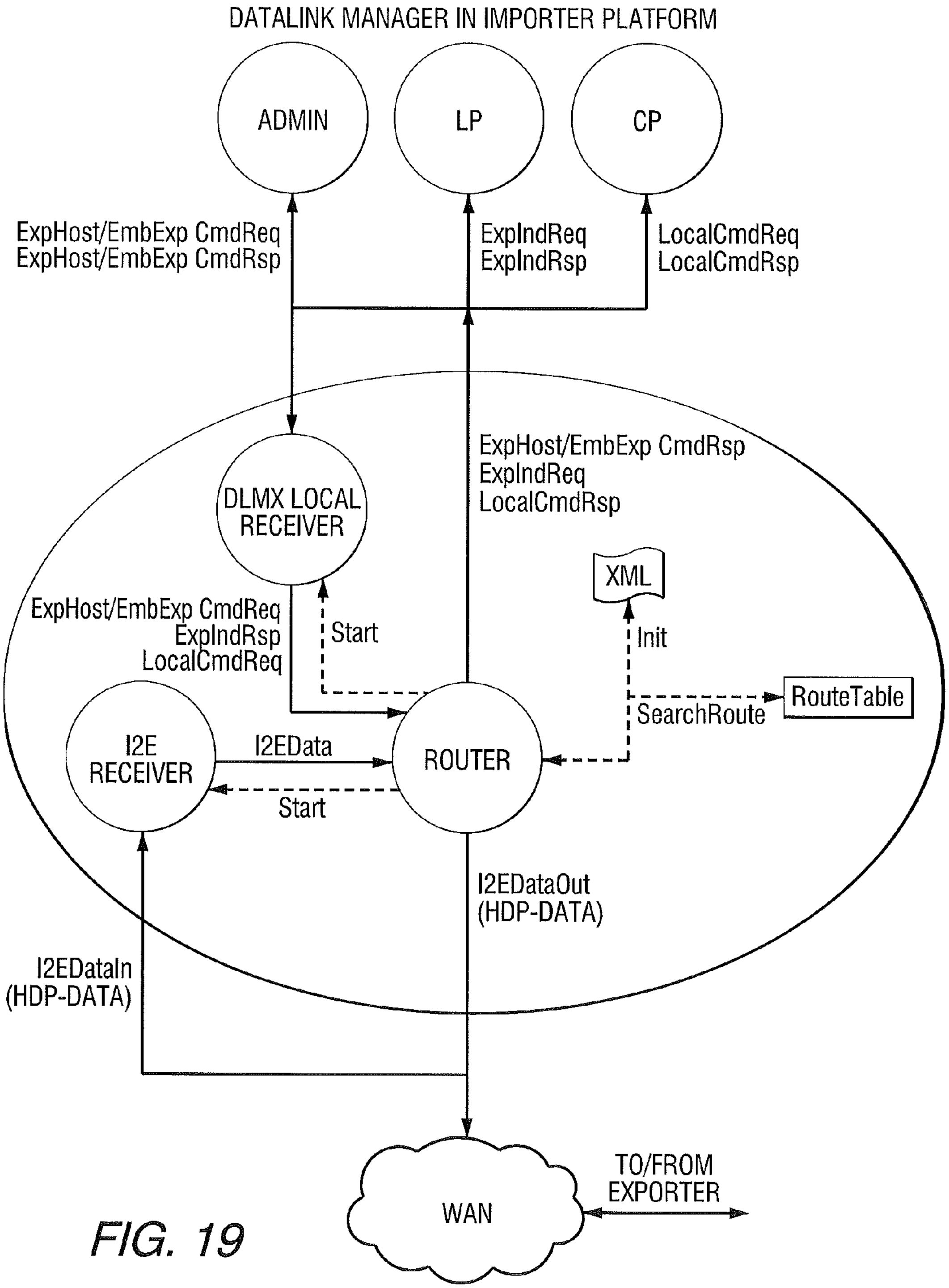
FIG. 19 is a diagram illustrating data flow in an importer.

FIG. 19 shows that the DLM in the importer platform receives the exporter or exciter command HDP frames from the exporter or exciter on the I2E Receiver link.

The DLM software components can be designed in a way that benefits broadcast manufacturers by providing one common communication software running in multiple platforms. It also provides more flexibility to create multiple instances of TCP and UDP receiver CSUs based on configuration database entries, and provides more CSU reusability.

As will be appreciated from the foregoing description and accompanying figures, HDP is a fundamental broadcast equipment communication protocol that is used to deliver content, command and control messages between broadcast equipment components from either local or external locations.

HDP facilitates communications between all of the various HD Radio components to support creation, distribution, command and control of the entire HD Radio system and its content from local, centralized and/or remote locations. HDP is an extensible general purpose protocol that is suitable for both unidirectional and bidirectional links. HDP provides options to improve robustness to network errors by providing fragmentation and error correction, and to improve security by enabling the ability to digitally sign messages being received from other broadcast components and systems.

The HD content is carried from the source to the destination through a number of layers. The data at each layer is encapsulated in a series of frames. The Content Layer (CL) is specific to the destination process but typically consists of information about the payload needed by the destination process such as message identifier, sequence number, or any special processing required. The Transmission and Authentication Layer (TAL) authenticates data received from the AFL and does routing to different processes in the same broadcast component. The AF Layer Header (AFL) moves frames from one broadcast system to another, and combines the elementary data into a cohesive block of related data or HDP message.

The AFL footer includes a CRC check that allows the detection of transmission errors at the destination. An optional Protection, Fragmentation and Transportation (PFT) Layer allows fragmentation of the potentially large AFL frames, and adds the possibility of having addressing and FEC. The AFL frames or the PFTL fragments can then be transported by any one of a number of physical links. The Data Link Manager indicated in FIG. 10 is the process that exists on all broadcast components, and is responsible for processing the TAL and AFL Layers. Any information or content transmitted by HDP is called application data. The entire HDP stack requires an additional 24 to 44 bytes.

While the invention has been described in terms of several examples, it will be apparent to those skilled in the art that various changes can be made to the described examples without departing from the scope of the invention as set forth in the following claims.

What is claimed is:

1. A data link manager comprising:

one or more hardware processors;

a User Datagram Protocol (UDP) receiver configured to receive HD Radio broadcast equipment communication protocol (HDP) data using a User Datagram Protocol/Internet Protocol (UDP/IP) protocol, wherein the UDP receiver verifies Application Frame Layer (AFL) sequence numbers for HDP frames and if the HDP frames are received out of order, the UDP receiver reorders the HDP frames;

a Transmission Control Protocol (TCP) receiver, wherein the TCP receiver receives the HDP data using Transmission Control Protocol/Internet Protocol (TCP/IP); and a router for receiving data from the UDP receiver and the TCP receiver, for searching for a destination route in a routing table, and for forwarding the data received from the UDP receiver and the TCP receiver to an identified destination route wherein the UDP receiver, the TCP receiver, and the router are implemented by the one or more hardware processors.

2. The data link manager of claim 1, further comprising:

a configuration database providing link and routing information.

3. The data link manager of claim 1, wherein:

if the data received by the UDP receiver is on an HDP link, then the UDP receiver unpacks the HDP data and forwards the data to the router.

4. The data link manager of claim 1, wherein:

the TCP receiver forwards the data to the router.

5. The data link manager of claim 1, wherein:

if the destination route is a HDP link, then the router formats the received data according to HDP and forwards the data to the identified destination route.

6. The data link manager of claim 5, wherein:

if the HDP link is broken due to network problem or no data activity, then the TCP receiver automatically retries to connect to another broadcast component.

7. The data link manager of claim 1, wherein:

the router provides data activity or monitoring facility for each HDP link separately.

8. The data link manager of claim 1, wherein:

the router provides data multicast facility to achieve one exporter communicating to multiple exgine broadcast components.

9. The data link manager of claim 1, wherein:

if the Application Frame Layer (AFL) sequence number and an expected sequence number do not match, a difference between the Application Frame Layer (AFL) sequence number and the expected sequence number is determined and the HDP frames are reordered if the difference is less than a maximum reorder depth.

* * * * *